(No Model.)
W. R. ZEIGLER.
CAR BRAKE.
No. 442,085. Patented Dec. 2, 1890.
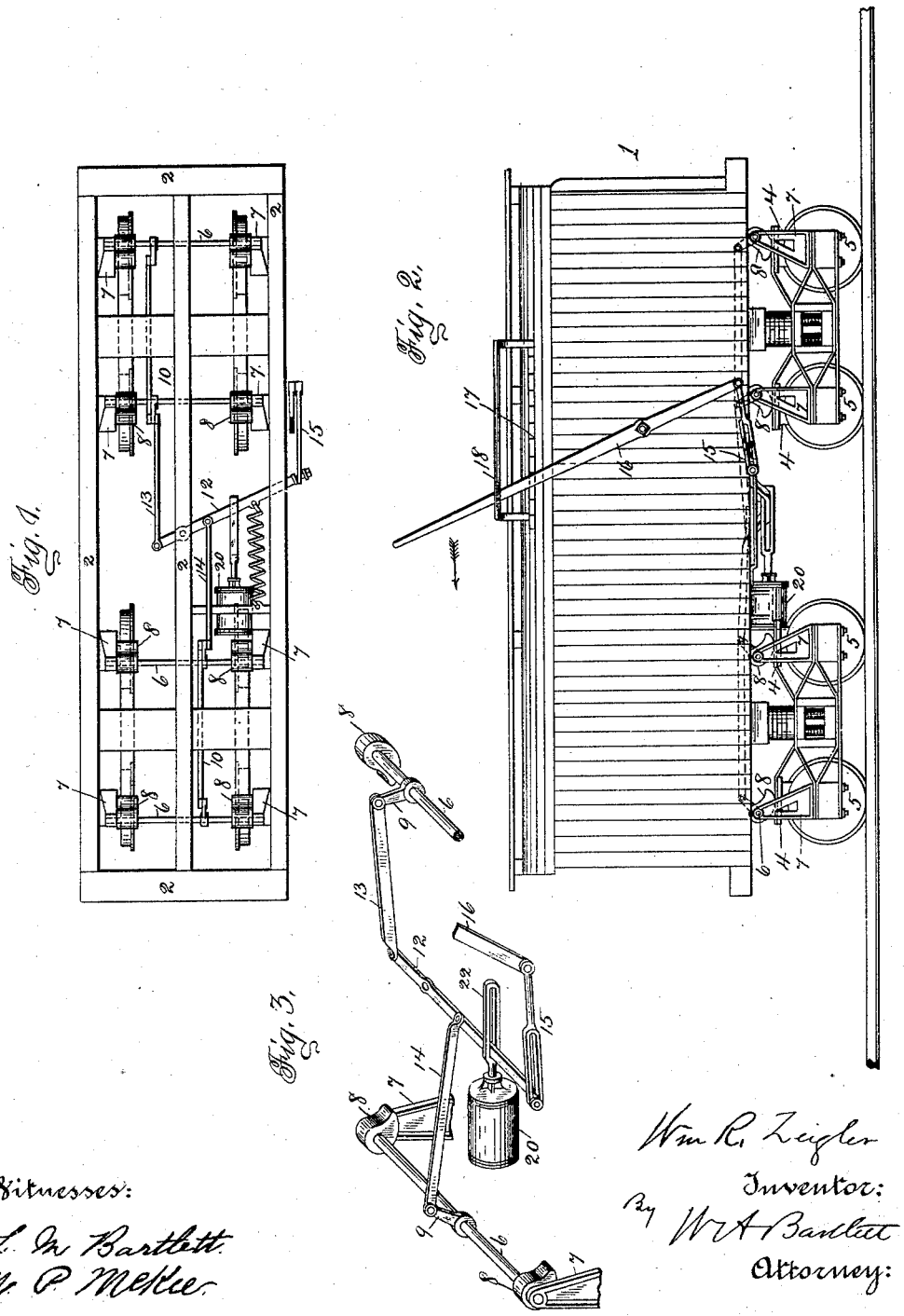
Witnesses:
L. M. Bartlett.
M. P. McKee.
Wm. R. Zeigler
Inventor:
By W. H. Bartlett
Attorney:

UNITED STATES PATENT OFFICE.

WILLIAM R. ZEIGLER, OF WAVERLY, NEW YORK, ASSIGNOR OF ONE-HALF TO MILES S. HOADLEY, OF SAME PLACE.

CAR-BRAKE.

SPECIFICATION forming part of Letters Patent No. 442,085, dated December 2, 1890.

Application filed May 5, 1890. Serial No. 350,549. (No model.)

*To all whom it may concern:*

Be it known that I, WILLIAM R. ZEIGLER, residing at Waverly, in the county of Tioga and State of New York, have invented certain new and useful Improvements in Car-Brakes, of which the following is a specification, reference being had therein to the accompanying drawings.

This invention relates to brakes for railway-cars.

The object of the invention is to produce a brake which may be used either by hand or by the application of an elastic medium—such as air or steam—and in which the air-brake or hand-brake may be applied independently of each other, and the air-brake will have no effect on the operating-lever of the hand-brake, and vice versa.

Figure 1 is a plan of the floor-timbers or frame of a car, showing the relation of the trucks thereto and the general arrangement of parts. Fig. 2 is a side elevation of a freight-car, showing, generally, the relation of parts. Fig. 3 is a broken diagrammatic perspective view showing the general relation of some of the parts.

Some parts not considered essential are omitted in all the figures.

The numeral 1 indicates a car-body. 2 2 are timbers constituting part of the lower frame.

The trucks 3 3 are attached in any usual manner.

Brake-shoes 4 4 are supported over each wheel by springs of such strength as to hold the shoes normally away from the tread of wheels 5. Rock-shafts 6 6 extend across the trucks over the brake-shoes and are supported in bearings 7 7, rigidly connected to the trucks. These rock-shafts have cams 8 8 rigidly attached, so that when the shafts are rocked to operate the brakes the cams will bear on the brake-shoes and bring said shoes down upon the wheel-treads. The rock-shafts are provided with arms 9, which are rigidly connected to said shafts. The cams on the trucks face in different directions, so that the brakes on the trucks are applied by rocking the shafts 6 in opposite directions. The arms 9 9 on the shafts 6 of each truck are preferably connected by a rod or chain 10, so that the shafts of each truck will move together. A lever 12 is pivoted about midway of the car and extends in a direction generally transverse to the car-body. A rod 13 connects the rock-shaft arm 9 of the truck to lever 12 at one side of its pivot, and a similar rod 14 connects the other arm at the other side of the pivot. The swinging of lever 12 will thus rock the shafts of the two trucks in opposite directions. The lever 12 extends to a convenient position, preferably at one side, if in a freight-car, for engagement with the open link 15, and the lever may pass through the link (or an equivalent might be a rod with stops thereon engaging the lever to allow lost motion.) One end of link 15 is pivoted to lever 16, which lever is pivoted to the car-body and extends above the roof thereof, where it may be held by ratchet 17 and guard 18. When the lever 16 is swung in the direction indicated by the arrow, Fig. 2, slotted link 15 will draw on lever 12, and through the rods 13 14 and the rock-shafts and cams will apply the brakes, but if lever 16 be swung in reverse direction the link 15 will move on lever 12 and will not necessarily move said lever. The brakes, however, will be released by the operation of the springs, which support the brake-shoes.

In connection with each car there is an air-cylinder or similar device 20, which may operate as a presser or exhaust brake. Air or steam will be supplied to the cylinder, as usual. Cylinder 20 has a piston and rod 21, which rod is connected to the lever 12, preferably by an open link 22, lever 12 passing through said link.

Referring now to Fig. 3, if the piston 21 and link 22 be forced in the direction of the arrow the lever 12 will be swung by link or piston rod 22, but will swing on link 15 without moving said link. Conversely, if lever 16 be operated the lever 12 may be swung in link 22 without working the brake-lever 16. Thus while the cams and brake-shoes are the same for both systems the operating parts are in great measure independent of each other. It is apparent that one rock-shaft only may be applied to each truck, if a brake on one-half the wheels be deemed sufficient. Of course it will be understood that connection may be made from the hand-lever or the air-cylinder to the lever 12 without allowing a lost motion. This will necessitate a movement of the hand-lever 16 whenever the device is operated by air and a movement of the air-piston when the hand-brake is operated, which is considered an inferior construction.

The air-cylinder 20 is referred to as being a common means of applying power to an air-brake. Equivalents will be understood as coming within the scope of this invention.

What is claimed is—

1. A car-truck having brake-shoes over the wheels, transverse rock-shafts hung in bearings on the truck and having cams over the brake-shoes, an arm or lever on each rock-shaft, rods connecting said arms, and an operating-lever connected to said arms to apply the brakes, in combination, substantially as described.

2. A car having two trucks, brake-shoes over wheels on each truck, a transverse shaft on each truck having cams over the brake-shoes, said cams faced in opposite directions on the different trucks, a lever operating transversely of the car-body, and connections from arms on the rock-shafts to said lever at each side of its pivot, whereby the movement of the lever rocks the shafts in opposite directions, substantially as described.

3. The combination of the brake-shoes, cams, rock-shafts, and connections, substantially as described, with the transverse lever, a hand-lever connected to said transverse lever, and an air-cylinder also connected to said transverse lever, all substantially as described.

4. The combination of the rock-shafts, cams, and connections, substantially as described, to the transverse lever, a hand-lever connected to said transverse lever by an open link, and an air-cylinder operatively connected to said transverse lever, substantially as described.

5. The combination of the brake-shoes, cams, rock-shafts, and connections, substantially as described, to the transverse lever, a hand-lever connected to said transverse lever by an open link, and an air-cylinder connected to the transverse lever, so as to permit independent movement thereof, substantially as described.

In testimony whereof I affix my signature in presence of two witnesses.

WILLIAM R. ZEIGLER.

Witnesses:
W. A. BARTLETT,
PHILIP F. LARNER.